(12) United States Patent
Lee et al.

(10) Patent No.: US 7,671,841 B2
(45) Date of Patent: Mar. 2, 2010

(54) PORTABLE TERMINAL WITH POSITION-VARIABLE DISPLAY AND METHOD

(75) Inventors: Seung-Il Lee, Seoul (KR); Jee-Yeon Kim, Seoul (KR); Hyun-Sook Park, Seoul (KR); Hye-Jeong Choi, Seoul (KR); Jong-Cheol Kim, Seoul (KR); Byeong-Sung Hong, Seoul (KR)

(73) Assignee: LG Electronics, Inc., Seoul (KR)

( * ) Notice: Subject to any disclaimer, the term of this patent is extended or adjusted under 35 U.S.C. 154(b) by 628 days.

(21) Appl. No.: 11/009,268

(22) Filed: Dec. 9, 2004

(65) Prior Publication Data

US 2005/0122311 A1 Jun. 9, 2005

(30) Foreign Application Priority Data

Dec. 9, 2003 (KR) .................. 10-2003-0089110

(51) Int. Cl.
*G09G 5/00* (2006.01)
(52) U.S. Cl. .............. 345/158; 345/156; 345/659; 345/905; 248/920; 379/433.04; 379/433.12; 455/575.4
(58) Field of Classification Search ........... 345/156, 345/158, 659, 905; 248/920; 455/575.4; 379/433.04, 433.12, 433.13
See application file for complete search history.

(56) References Cited

U.S. PATENT DOCUMENTS

| | | | | |
|---|---|---|---|---|
| 5,102,082 A | * | 4/1992 | Bang ................. | 248/183.2 |
| 5,708,561 A | | 1/1998 | Huilgol et al. | |
| 5,966,776 A | * | 10/1999 | Ona ..................... | 16/328 |
| 6,009,336 A | * | 12/1999 | Harris et al. ........... | 455/566 |
| 6,522,529 B1 | * | 2/2003 | Huilgol et al. ......... | 361/681 |
| 6,633,643 B1 | * | 10/2003 | Ona ..................... | 379/433.13 |
| 6,789,976 B2 | * | 9/2004 | Hung et al. ............ | 403/84 |
| 6,850,226 B2 | * | 2/2005 | Finke-Anlauff ........ | 345/169 |
| 7,054,145 B2 | * | 5/2006 | Tanaka et al. .......... | 361/679 |
| 7,071,916 B2 | * | 7/2006 | Duarte et al. .......... | 345/156 |

(Continued)

FOREIGN PATENT DOCUMENTS

CN 1455613 11/2003

(Continued)

OTHER PUBLICATIONS

Sclater, N., Chironis, N.P. (2001). Mechanisms and Mechanical Devices Sourcebook (3rd Edition). (pp. 416-417). McGraw-Hill. (Online version available at: http://www.knovel.com/knovel2/Toc.jsp? BookID=659&VerticalID=0).*

(Continued)

*Primary Examiner*—Amare Mengistu
*Assistant Examiner*—Robert R Rainey
(74) *Attorney, Agent, or Firm*—Lee, Hong, Degerman, Kang & Waimey

(57) ABSTRACT

A portable terminal with a position-variable display comprising a main body for inputting information and controlling communication, a folder coupled to the main body, a display unit rotationally disposed on the folder for displaying image information, a rotating means for providing angular rotation of the display unit along a plane of the folder, and a sliding means for moving the display unit in a direction along a length of the portable terminal.

14 Claims, 8 Drawing Sheets

U.S. PATENT DOCUMENTS

| | | | |
|---|---|---|---|
| 7,092,246 B2 * | 8/2006 | Tanaka et al. | 361/681 |
| 7,159,833 B2 * | 1/2007 | Kato | 248/349.1 |
| 7,174,195 B2 * | 2/2007 | Nagamine | 455/575.1 |
| 2003/0124991 A1 * | 7/2003 | Kiuchi et al. | 455/90 |
| 2003/0134170 A1 | 7/2003 | Sarkar et al. | |
| 2003/0223576 A1 | 12/2003 | Totani | |
| 2004/0121826 A1 * | 6/2004 | Ma et al. | 455/575.4 |

FOREIGN PATENT DOCUMENTS

| | | |
|---|---|---|
| EP | 1 124 175 A2 | 8/2001 |
| EP | 1324572 A1 | 7/2002 |
| EP | 1353488 | 10/2003 |
| EP | 1357726 A1 | 10/2003 |
| JP | 2001 156893 | 6/2001 |
| JP | 2002-118633 | 4/2002 |
| JP | 2003-032335 | 1/2003 |
| JP | 2003-304316 | 10/2003 |
| JP | 2003-319043 | 11/2003 |

OTHER PUBLICATIONS

Walsh, R.A. (2000). Electromechanical Design Handbook (3rd Edition). (pp. 8.193). McGraw-Hill. (Online version available at: http://www.knovel.com/knovel2/Toc.jsp?BookID=657&VerticalID=0).*

Oberg, E.; Jones, F.D.; Horton, H.L.; Ryffell, H.H. (2000). Machinery's Handbook (26th Edition). (pp. 2236). Industrial Press. (Online version available at: http://www.knovel.com/knovel2/Toc.jsp?BookID=309&VerticalID=0).*

* cited by examiner

PORTABLE TERMINAL WITH POSITION-VARIABLE DISPLAY AND METHOD

CROSS-REFERENCE TO RELATED APPLICATIONS

Pursuant to 35 U.S.C. § 119(a), this application claims the benefit of earlier filing date and right of priority to Korean Application No. 10-2003-89110, filed on Dec. 9, 2003, the contents of which is hereby incorporated by reference herein in its entirety.

BACKGROUND OF THE INVENTION

1. Field of the Invention

The present invention relates to a portable terminal, and more particularly to a portable terminal with a position-variable display capable of producing images in a wide format and a long format.

2. Description of the Related Art

Generally, a portable terminal is a communication device allowing a user to transmit and receive a voice signal to and from another user anywhere in the world. Because information and communication technologies have rapidly developed, range of uses for portable terminals have expanded. For example, portable terminals are capable of accessing the Internet and receiving television (TV) signals. They are also capable of photographing still or dynamic objects and transmitting and receiving photographed images to and from another user. Due to the various functions of the portable terminal, technology for displaying image information has become important. Therefore, research and development of image displaying technologies has been active.

Referring to FIG. 1, a portable terminal comprises a main body 100 for inputting information and controlling communication, a folder 200 having a display 210 for outputting the information as an image, a hinge coupling module 300 for hinge-coupling the folder 200 to the main body 100 so that the folder 200 may be folded onto the main body 100, a rotating module 400 disposed at the hinge coupling module 300 and the folder 200 for rotating the folder 200 around an axis lying parallel with the length of the folder 200, a microphone unit 110 mounted on the main body 100, and a speaker unit 220 mounted on the folder 200.

The main body 100 comprises a main body casing 120 forming the outer appearance of the main body 100, a plurality of function keys 130 arranged on a surface of the main body casing 120, and circuit components mounted inside the main body casing 120. A battery 140 is detachably coupled to a side of the main body 100. The folder 200 comprises a folder casing 230 for externally exposing the display 210 and a plurality of circuit components mounted inside the folder casing 230. The speaker unit 220 is mounted on the folder casing 230 at the upper portion of the display 210.

The display 210 may be a liquid crystal display (LCD) screen formed in a rectangular shape, wherein the length direction of the display 210 is identical to the length direction of the folder 200. The hinge coupling module 300 has a hinge axis for coupling the main body 100 to the folder 200. A camera 150 is mounted on the hinge axis.

When the portable terminal is not in use, but is carried by the user, the folder 200 may be folded onto the surface of the main body 100 where the function keys 130 are installed. When the user uses the portable terminal, the user opens the folder 200 from the main body 100. After opening, the folder 200 may be angularly rotated by using the hinge coupling module 300 disposed at one side of the main body 100 as an axis, wherein the length direction of the angularly-rotated folder 200 is positioned approximately on the same line as the length direction of the main body 100. In addition, the length direction of the display 210 coupled to the folder 200 is also positioned approximately on the same line as the length direction of the main body 100. When the user holds the main body 100 and watches the display 210 so that the front surface of the main body 100 can be positioned in front of the user, an image displayed on the display 210 is outputted on a long screen having a relatively smaller horizontal length than a vertical length.

When the user transmits and receives voice information to and from another user, the user uses the microphone unit 110 mounted on the main body 100 and the speaker unit 220 mounted on the folder 200. The speaker unit 220 can provide voice information such as songs or bell sounds.

Additionally, when the user watches television or observes other image information, such as a movie through the Internet, the user may select a wide screen format having a relatively larger horizontal length than a vertical length for vividness of images. In such a case, when the folder 200 is folded onto the main body 100, the folder 200 may first be rotated from the main body 100 by approximately 90° using the hinge coupling module 300 as an axis. Subsequently, the folder 200 may then be rotated by approximately 90° using the rotating module 400 as an axis.

The front surface of the folder 200 rotated by approximately 90° using the rotating module 400 is positioned approximately parallel to the side surface of the main body 100, wherein the length direction of the folder 200 is approximately perpendicular to the front surface of the main body 100. In addition, the display 210 fixedly coupled to the folder 200 is positioned approximately parallel to the side surface of the main body 100, wherein the length direction of the display 210 is approximately perpendicular to the front surface of the main body 100.

Accordingly, when the user holds the main body 100 so that the side surface of the main body 100 is positioned in front of the user, the length direction of the display 210 is positioned in the horizontal direction of the user. An image outputted to the display 210 is in a wide format having a relatively larger horizontal length and a vertical length, which is suitable for the position of the display 210.

The main body 100 comprises a sensing module for sensing the position of the folder 200 and an image output corrector for changing the position of the output image according to the position of the folder 200 sensed by the sensing module. For example, when the position of the folder 200 is changed from a long format to a wide format or vice versa, the position of the output image is changed according to the changed position of the folder 200. Therefore, a slanted, inverse or otherwise skewed screen image is never displayed on the display 210 despite having a changed position of the folder 200. Thus, the user can conveniently enjoy the image.

Furthermore, when the user inputs still or dynamic image information using the camera 150, the user can input wide format image information having a relatively larger horizontal length than a vertical length by positioning the length direction of the display 210 in the horizontal direction.

As described above, when the user watches a movie or television programming through the portable terminal, the user can watch a wide format image having a relatively large horizontal length as well as a long format image having a relatively large vertical length, and is thus provided with better services.

However, operation of the wide format can be problematic in the portable terminal. For example, in order to view a wide format image, the folder 200 which the display 210 is fixedly coupled to must first be rotated by approximately 90° using the hinge coupling module 300 as an axis and then rotated by approximately 90° using the rotating module 400 as an axis. Further, the user must rotate the main body 100 by approximately 90° so that the side surface of the main body 100 is positioned in front of the user in order to have an unobstructed view of the screen.

Another problem arises because the portable terminal cannot stand alone while in the wide format configuration. Hence, while the user watches the wide screen, the user must hold the portable terminal. This causes discomfort in the user, especially when the user is watching a movie or observing an image for a lengthy amount of time. Accordingly, if the user happens to drop the portable terminal due to fatigue, components of the portable terminal will be damaged because of the portable terminal's relatively low structural integrity resulting from the folder 200 being positioned vertically to the main body 100. Therefore, the user's enjoyment of the portable terminal is lessened.

SUMMARY OF THE INVENTION

The present invention provides for a portable terminal with a position-variable display which allows a user to conveniently enjoy images on a display in a wide format as well as a long format. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention in one embodiment is a portable terminal with a position-variable display, comprising a main body for inputting information and controlling communication, a folder coupled to the main body, a display unit rotationally disposed on the folder for displaying image information, a rotating means for providing angular rotation of the display unit along a plane of the folder, and a sliding means for moving the display unit in a direction along a length of the portable terminal.

In an exemplary embodiment, the portable terminal further comprises a housing unit formed on a surface of the folder and corresponding with an outer appearance of the display unit such that the display unit is rotatably inserted into the housing unit. The display unit comprises a rotary casing and a display fixedly coupled to the rotary casing for displaying images on a screen, wherein a width of the rotary casing is equivalent to a width of the folder.

At least one side of the rotary casing has a curved surface with a predetermined radius of curvature, wherein the radius of curvature of the at least one side of the rotary housing is identical to a radius of curvature of a short jaw surface of the housing unit. The display is formed in a rectangular shape having a length and a width, wherein the length of the display lies along the same direction as the length of the display unit and the width of the display lies along the same direction as the width of the display unit.

In another exemplary embodiment, the rotating means comprises a slider slidably coupled to the folder and a cam holder rotatably coupled to the slider and fixedly coupled to the display unit. The slider comprises a base unit, a cylindrical axis unit formed at a surface of the base unit, and a position fixing protrusion unit formed at the cylindrical axis unit. The cam holder comprises a cylinder unit having a larger inside diameter than an outside diameter of the cylindrical axis unit, a cam unit formed at an end of the cylinder unit, and a mounting unit formed at an outer circumference of the cylinder unit.

The rotating means may further comprise pressuring means inserted into the mounting unit for pressuring the cam holder to the slider and a fixing member 840 fixedly coupled to the an end of the axis unit and inserted into the cylinder unit for supporting the pressuring means. The cam unit is formed in a waveform shape having a plurality of concave and convex parts. The fixing member is a nut and is coupled to a thread formed on an outer circumference of the cylindrical axis unit.

In one aspect, a sensing means for sensing the rotation position of the display unit is installed in the folder and the display unit. The sensing means comprises magnets disposed at the display unit and a plurality of sensors circularly arranged at the folder for sensing the position of the magnets.

In another aspect, the sliding means comprises a guide groove formed on a surface of the folder in a direction along the length of the folder sliding grooves formed on side walls of the guide groove, sliding protrusions formed at sides of the rotating means and movably inserted into the sliding grooves, and a removable unit for fixing the sliding protrusions in a set position.

The removable unit comprises a plurality of plate spring protrusions formed on side walls of the guide groove and fixing grooves formed on the sliding protrusions. The plate spring protrusions are arranged in pairs at predetermined intervals along the length of the guide groove, wherein a center pair of plate spring protrusions are positioned at the center of the length of the guide groove.

In a further aspect, at least one speaker unit is installed on the display unit. Also, the portable terminal may further comprise an image output corrector for changing an output image of the portable terminal according to a changed position of the display unit.

In accordance with another embodiment of the invention, a method for operating a portable terminal with a position-variable display comprises opening a folder from a main body of the portable terminal, the folder comprising a display unit for displaying image information, the display unit being rotationally disposed on the folder, rotating the display unit by a predetermined angle along a plane of the folder, and changing a position of an image outputted to the display unit according to the rotation angle of the display unit. The method may further comprise moving the display unit in a direction along the length of the portable terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
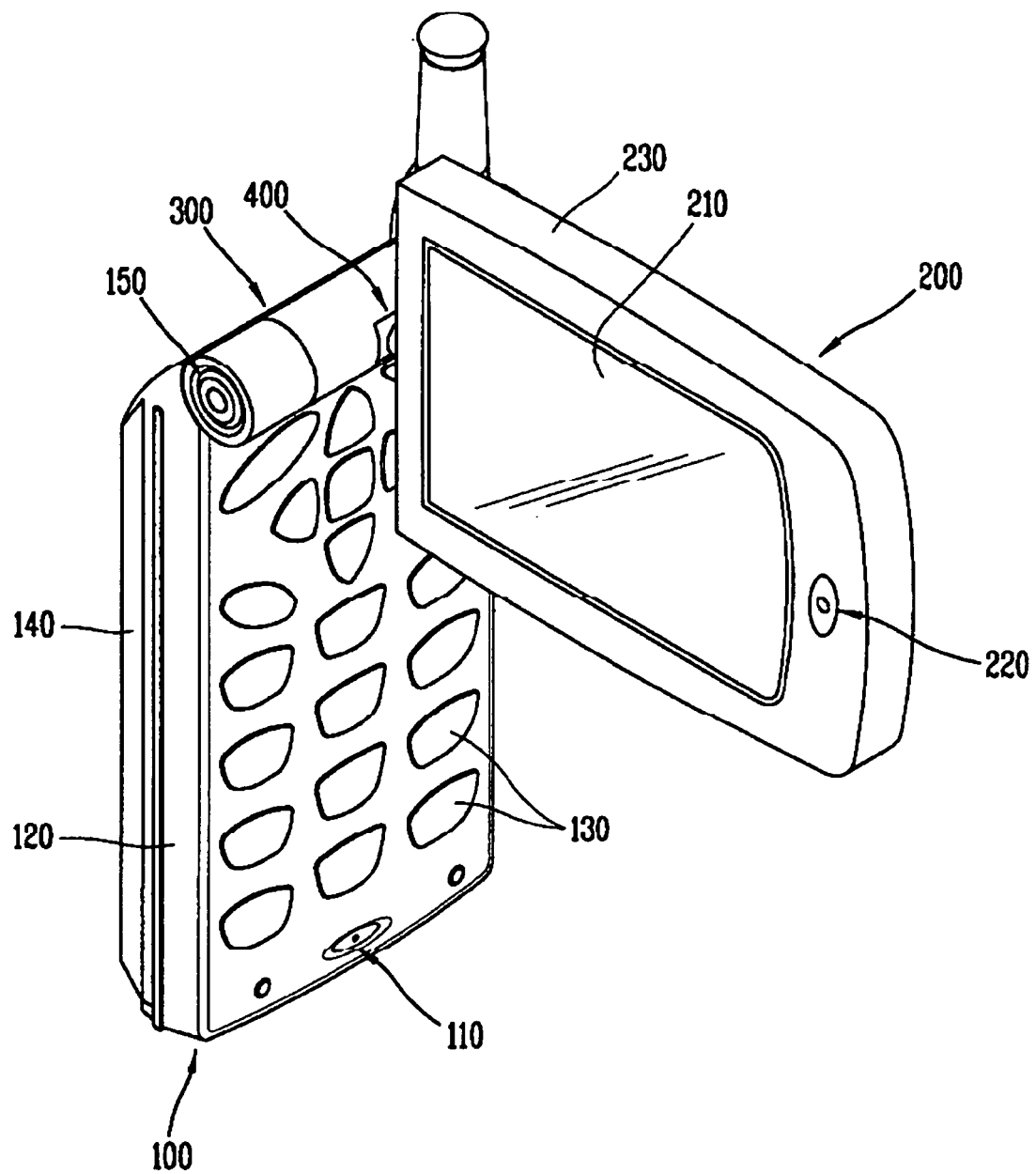
FIG. 1 is a perspective view of a related art portable terminal.
Figure 2:
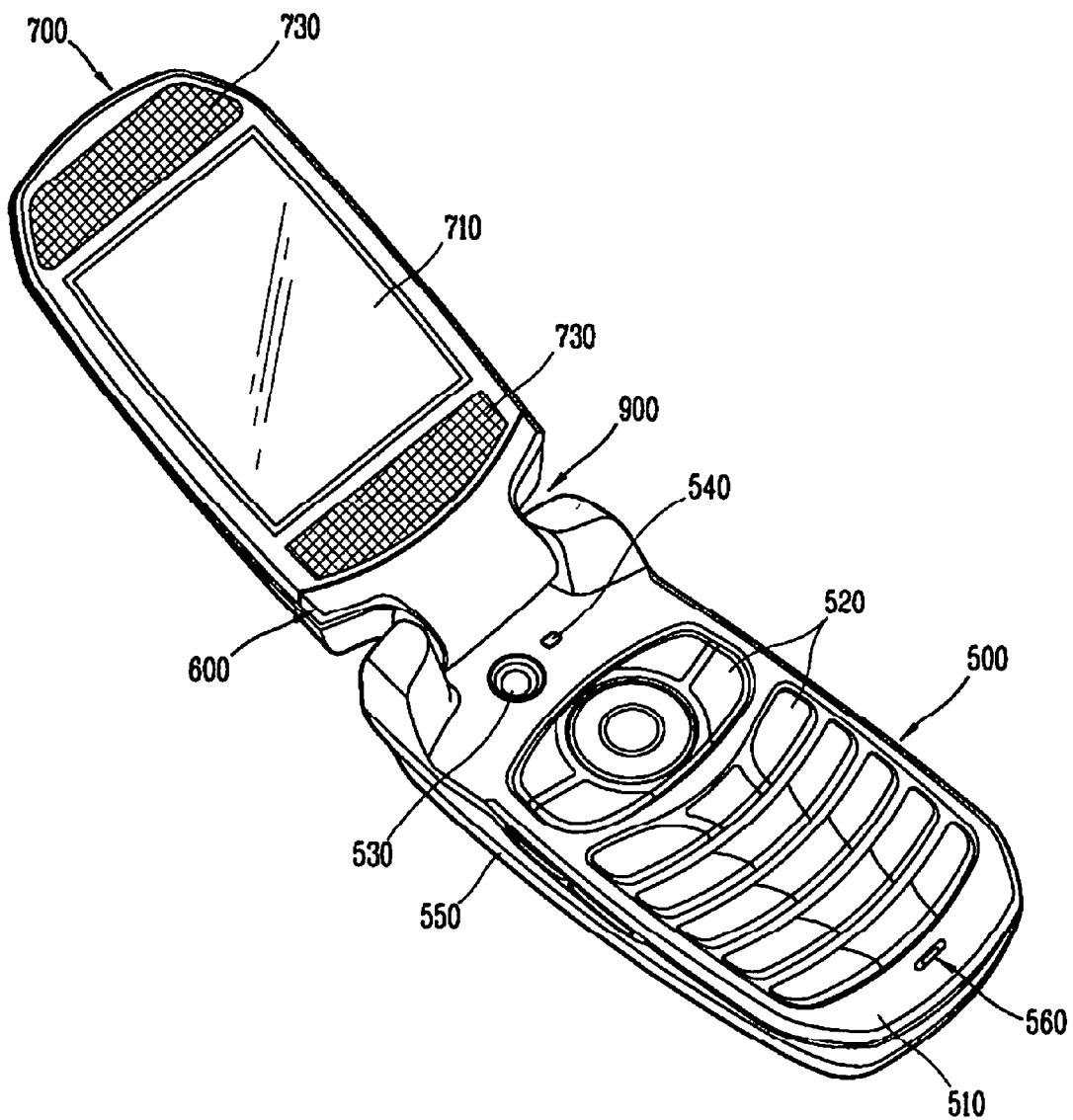
FIG. 2 is a perspective view of a portable terminal with a position-variable display in accordance with one embodiment of the invention.
Figure 3:
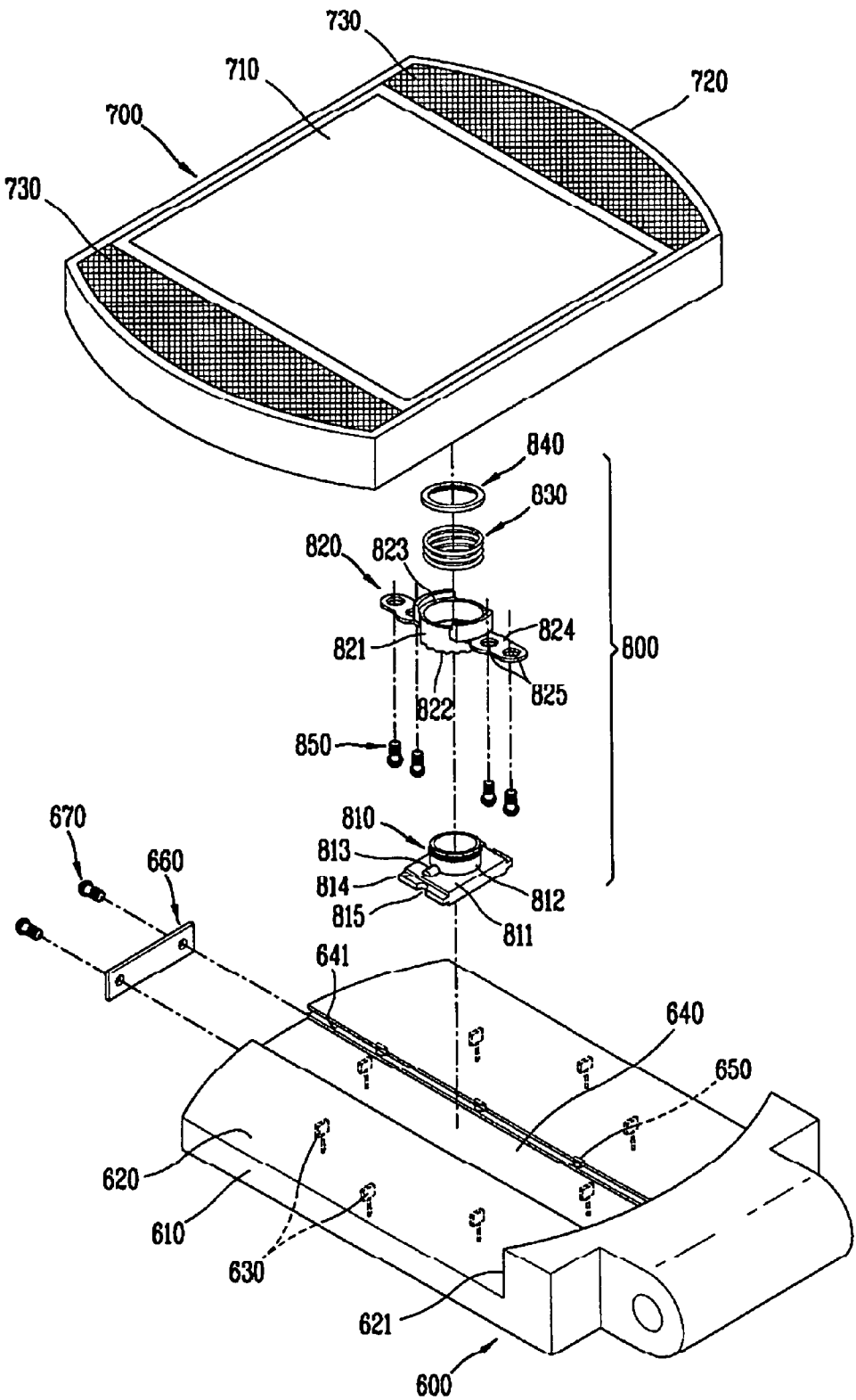
FIG. 3 is a perspective view of a disassembled portable terminal with a position-variable display in accordance with one embodiment of the invention.

Referring to FIGS. 2 and 3, a portable terminal with a position-variable display comprises a main body 500 for inputting information and controlling communication, a folder 600 movably coupled to the main body 500, a display unit 700 for displaying image information, a rotating module 800 for rotating the display unit 700 on the folder 600, and a sliding module for moving the display unit 700 in a horizontal direction of the folder 600.

The main body 500 comprises a main body casing 510 having a predetermined width and length and housing circuit components within, a plurality of function keys 520 disposed on the a surface of the main body casing 510, a camera 530 and a flash 540 mounted on the front surface of the main body casing 510, a battery 550 detachably mounted on a rear surface of the main body casing 510, and a microphone unit 560 mounted on the front surface of the main body casing 510. The main body 500 further comprises an image output corrector for changing an output image of the portable terminal according to a changed position of the display unit 700.

The folder 600 is coupled to the main body 500 by a hinge coupling module 900 and is rotated by a predetermined angle using the hinge coupling module 900 as an axis. In the folder 600, a housing unit 620 is formed on a surface of a folder casing 610 having a predetermined thickness, width and length. The housing unit 620 is formed on a surface of the folder casing 610 to correspond with an outer appearance of the display unit 700. The housing 620 has a predetermined depth such that the display unit 700 can be rotatably inserted into the housing unit 620. In addition, the housing unit 620 is positioned on a surface away from the surface of the folder casing 610 on which the hinge coupling module 900 is positioned. A bottom surface of the housing unit 620 is plane. A short jaw surface 621 having a curved shape and a predetermined radius of curvature is formed on the folder casing 610 by the housing unit 620.

The display unit 700 comprises a rotary casing 720, a display 710 fixedly coupled to the rotary casing 720 for displaying image information on a screen, circuit components mounted inside the rotary casing 720, and speaker units 730 mounted on the rotary casing 720. The rotary casing 720 has a width equivalent to a width of the folder 600 and a predetermined depth. Preferably, one side of the rotary casing 720 has a curved surface having a predetermined radius of curvature while the other side of the rotary casing 720 may have a curved surface or other shape, wherein the radius of curvature is identical to the radius of curvature of the short jaw surface 621 of the housing unit 620. Furthermore, a thickness of the rotary casing 720 is identical to a depth of the housing unit 620.

The display 710 has a rectangular shape and is mounted on a front surface of the rotary casing 720 such that the length of the display 710 is along the same direction as the length of the rotary casing 720. Preferably, speaker units 730 are respectively mounted at both sides of the display 710 and are operated according to the rotation position of the display unit 700. In an exemplary embodiment, more than two speaker units 730 may be mounted. In addition, the speaker units 730 may be separated from the display unit 700 and mounted on the folder 600 or the main body 500.

The rotating module 800 comprises a slider 810, a cylindrical axis unit 812 having a predetermined length and formed on a surface of a base unit 811 coupled to the folder 600, a position fixing protrusion unit 813 formed on the axis unit 812, a cam holder 820 rotatably coupled to the slider 810 and fixedly coupled to the display unit 700, and a cam unit 822 having a predetermined shape and formed at an end of a cylinder unit 821. The cylinder unit 821 has a larger inside diameter than an outside diameter of the axis unit 812 and a predetermined length. The rotating module 800 further comprises a mounting unit 823 formed at an outer circumference of the cylinder unit 821, a coil spring 830, inserted into the mounting unit 823 for pressuring the cam holder 820 to the slider 810, and a fixing member 840 fixedly coupled to an end of the axis unit 812 and inserted into the cylinder unit 821 for supporting the coil spring 830.

Preferably, the base unit 811 of the slider 810 is formed in a square shape having a predetermined thickness and area. The axis unit 812 is vertically formed on the top surface of the base unit 811. A through hole is formed on the base unit 811. A wire for coupling the display unit 700 to the main body 500 is inserted into the axis unit 812 and the through hole.

Figure 4:
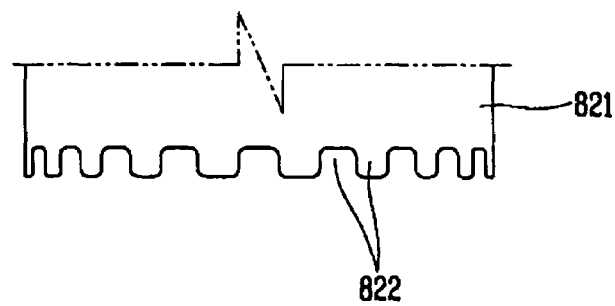
FIG. 4 is a front view of a cam unit of a portable terminal with a position-variable display in accordance with one embodiment of the invention.

The cam unit 822 of the cam holder 820 is formed at an end of the cylinder unit 821 in a waveform shape having a plurality of concave and convex parts. The number of waveforms determines an angle of rotation of the cam holder 820. When the number of waveforms increases, the angle of rotation of the cam holder 820 decreases. As shown in FIG. 4, in an exemplary embodiment, a plurality of square concave and convex parts are alternately formed at an end of the cylinder unit 821.

Preferably, the coil spring 830 is a compression coil spring having a constant outside diameter. Moreover, an inside diameter of the coil spring 830 is larger than an outside diameter of the axis unit 812 of the slider 810. The fixing member 840 is preferably a nut and is coupled to a thread formed on an outer circumference of the axis unit 812. An outside diameter of the nut is equal to or larger than an outside diameter of the coil spring 830.

Figure 5:
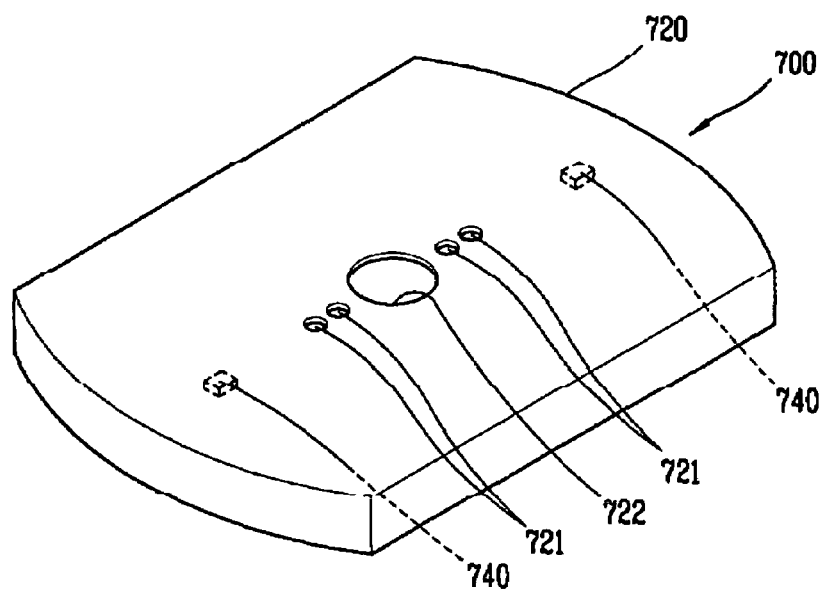
FIG. 5 is a perspective view of a display unit of a portable terminal with a position-variable display in accordance with one embodiment of the invention.

Coupling units 824 having a predetermined thickness and length are formed at opposite sides of an outer circumference of the cylinder unit 821. Through holes 825 are formed on the coupling units 824. As shown in FIG. 5, screw holes 721 are formed on a bottom surface of the rotary casing 720 to correspond with the through holes 825 of the coupling units 824. A through hole 722 is formed between the screw holes 721 for inserting the wire that couples the display unit 700 to the main body 500.

In order to couple the rotating module 800 to the display unit 700, the axis unit 812 of the slider 810 is inserted into the cylinder unit 821 of the cam holder 820. Further, the coil spring 830 is mounted on the mounting unit 823 of the cam holder 820 and the fixing member 840 is fixedly coupled to the end of the axis unit 812. A plurality of screws 850 are respectively inserted into the through holes 825 formed on the coupling units 824 and respectively fastened to the screw holes 721 formed on the rotary casing 720 to thereby fixedly couple the cam holder 820 to the rotary casing 720. The cam unit 822 engages the position fixing protrusion unit 813. As a result, the cam holder 820 closely adheres to the slider 810 due to the elasticity of the coil spring 830. Accordingly, the rotating module 800 is coupled to the display unit 700.

The slider 810 of the rotating module 800 is slidably coupled to the housing unit 620 of the folder 600 and the display unit 700 is inserted into the housing unit 620. Referring to FIGS. 3 and 5, the folder 600 and the display unit 700 include a sensing module for sensing the rotation position of the display unit 700. The sensing module comprises magnets 740 disposed at the display unit 700 and a plurality of sensors 630 circularly arranged at the folder 600 at predetermined intervals for sensing a magnetic field of the magnets 740.

The magnets 740 are mounted on a rear surface of the rotary casing 720 and are spaced apart by a certain distance. Preferably, two magnets 740 are arranged such that the distance between the magnets 740 is identical to a diameter of the circle formed by the sensors 630. The center of the circle formed by the sensors 630 corresponds to the center between the two magnets 740. The rotation position of the display unit 700, on which the magnets 740 are mounted, is more precisely sensed according to the number of sensors 630.

The sliding module comprises a guide groove 640 formed on a surface of the folder 600 along a direction corresponding to the length of the folder 600, sliding grooves 641 formed on side walls of the guide groove 640, sliding protrusions 814 formed at sides of the rotating module 800 and slidably inserted into the sliding grooves 641, and a removable unit for fixing the sliding protrusions 814 in set positions.

The guide groove 640 is formed on a surface of the housing unit 620 with a predetermined width and depth. The sliding grooves 641 are formed on side walls of the guide groove 640 along a direction corresponding to the length of the walls and have a predetermined width and depth. The sliding protrusions 814 are formed on side surfaces of the base unit 811 of the slider 810 along a direction corresponding to the length of the side walls of the guide groove 640. The sliding protrusions 814 have a predetermined thickness and height for inserting into the sliding grooves 641.

The removable unit comprises a plurality of plate spring protrusions 650 formed on the side walls of the guide groove 640 and fixing grooves 815 formed on the sliding protrusions 814. One plate spring protrusion 650 formed on a side wall of the guide groove 640 faces a corresponding plate spring protrusion 650 formed on an opposing side wall of the guide groove 640. Preferably, the plate spring protrusions 650 are arranged in pairs in three places at predetermined intervals along the length of the guide groove, wherein a center pair of plate spring protrusions 650 are positioned at the center of the length of the guide groove 640. It is noteworthy, however, that the plate spring protrusions 650 can also be arranged in pairs in more than three places. The fixing grooves 815 are positioned at center portions of the sliding protrusions 814 and formed according to the shape of the plate spring protrusions 650.

Each sliding protrusion 814 of the slider 810 is inserted into a corresponding sliding groove 641 formed on a side wall of the guide groove 640. The fixing grooves 815 formed on the sliding protrusions 814 are respectively fixed to the pair of plate spring protrusions 650 of the sliding grooves 641. A separation preventing cover 660 for preventing separation of the sliding protrusions 814 from the guide groove 640 is formed at an end of the guide groove 640, wherein the separation preventing cover 660 is fixedly coupled to a side portion of the folder 600 by a plurality of screws 670.

In accordance with one embodiment of the invention, the operation of the portable terminal with a position-variable display will be explained. When the user uses the portable terminal with a position-variable display, the user opens the folder 600 from the main body 500. Here, the length of the display unit 700 is along the same direction as the length of the folder 600. As shown in FIG. 2, of the two speaker units 730 installed in the display unit 700, the speaker unit 730 positioned at a top end of the length of the display unit is operational.

The coil spring 830 elastically supports the cam holder 820 so that the concave parts of the cam unit 822 can be fixedly hooked on the position fixing protrusion unit 813 to thereby prevent rotation of the display unit 700. In addition, the fixing grooves 815 of the slider 810 are engaged with the plate spring protrusions 650 to thereby prevent sliding of the display unit 700.

Figure 6:
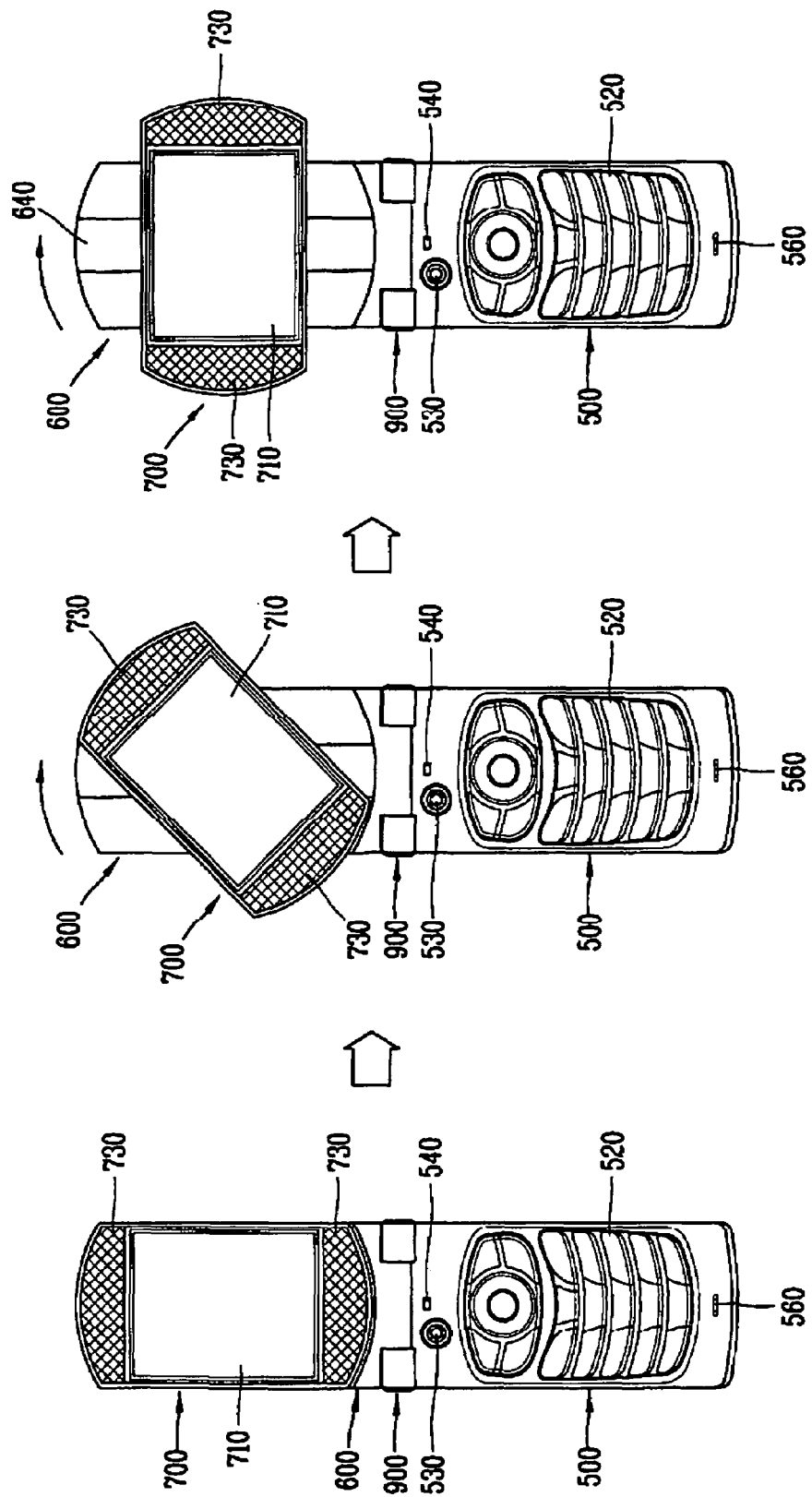
FIG. 6 is a front view of sequential steps of an operation state of a portable terminal with a position-variable display in accordance with one embodiment of the invention.

When the user watches a movie or television programming in a wide format, as shown in FIG. 6, the user opens the folder 600 from the main body 500 and rotates the display unit 700 by approximately 90°. When the user rotates the display unit 700, the cam unit 822 elastically supported by the coil spring 830 is hooked and rotated on the position fixing protrusion unit 813. When the display unit 700 arrives at the approximately 90°-rotated position, the concave parts of the cam unit 822 are fixedly hooked on the position fixing protrusion unit 813.

Accordingly, when the display unit 700 is rotated by approximately 90°, the length of the display unit 700 lies along a direction approximately perpendicular to the length directions of the main body 500 and the folder 600. Therefore, when the user holds the main body 500 such that the front surface of the main body 500 is positioned in front of the user, the length of the display unit 700 is along an approximately horizontal direction to the user. Thus, the display unit 700 forms a wide screen.

As the display unit 700 is rotated, the positions of the magnets 740 mounted on the display unit 700 change. The changed positions of the magnets correspond to a changed position of the display unit 700. Accordingly, when the sensors 630 sense the changed positions of the magnets 740, the changed position of the display unit 700 is also sensed. This information is then transmitted to the main body 500. Upon learning the changed position of the display unit 700, an output image can be corrected by the image output corrector of the main body 500 and outputted in a wide format suitable for the display 710. When the display unit 700 is horizontally positioned, the two speaker units 730 are positioned at the both sides of the display 710. Preferably, the two speaker units 730 are operational in order to improve sound quality.

Figure 7:
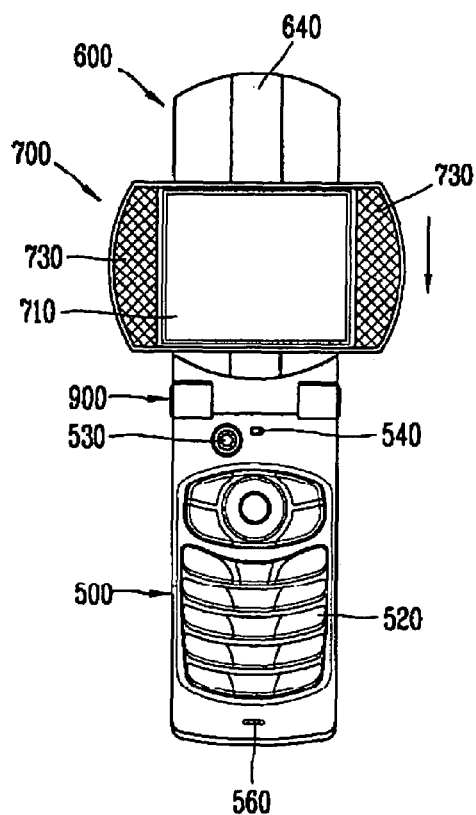
FIG. 7 is a front view of an operation state of a portable terminal with a position-variable display in accordance with one embodiment of the invention.
Figure 8:
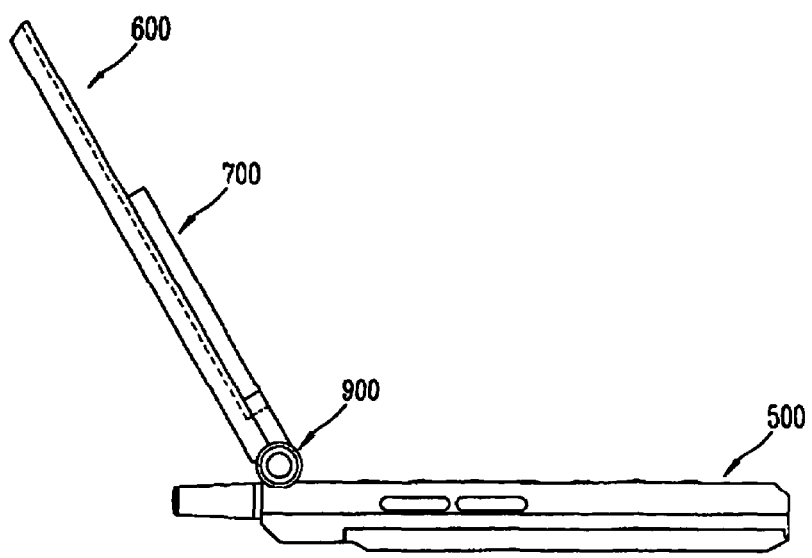
FIG. 8 is a side view of an operation state of a portable terminal with a position-variable display in accordance with one embodiment of the invention.

According to one embodiment, the user may operate the portable terminal without being held by hand. When the user puts the portable terminal on a table or other flat surface, as shown in FIG. 7, the user may push the display unit 700, rotated by approximately 90° and positioned in the horizontal direction, in a lower direction. Namely, the user may push the display unit 700 toward the hinge coupling module 900. When the display unit 700 is pushed to a lower portion, the plate spring protrusions 650 engaged with the fixing grooves 815 of the slider 810 coupled to the lower portion of the display unit 700 are transformed, the fixing grooves 815 are separated from the plate spring protrusions 650, and the slider 810 is moved to the lower portion along the guide groove 640. When the slider 810 is positioned at the lower portion of the guide groove 640, the plate spring protrusions 650 disposed at the lower portion of the guide groove 640 are engaged with the fixing grooves 815 of the slider 810, thereby fixing the position of the slider 810. As a result, the display unit 700 is fixed to the lower portion of the folder 600. Referring to FIG. 8, when the user places the portable terminal on the table or other flat surface, the center of gravity exists at the lower portion of the folder 600 resulting in the potable terminal being stably positioned.

When the user intends to use a long screen format after watching the movie or television programming in the wide format, the user pushes the display unit 700 to the center of the folder 600 and rotates the display unit 700 by approximately 90° in the opposite direction. Therefore, the display unit 700 returns to the original position. Once again, the sensors 630 sense rotation of the display unit 700, and thus the image outputted to the display 710 can be corrected and outputted in a long format.

In accordance with another embodiment of the invention, the slider 810 of the rotating module 800 can be fixed on the bottom surface of the housing unit 620 of the folder 600 without using the sliding module. Therefore, the display unit 700 is not moved in an upper or lower direction of the folder 600, but can be rotated.

Figure 9:
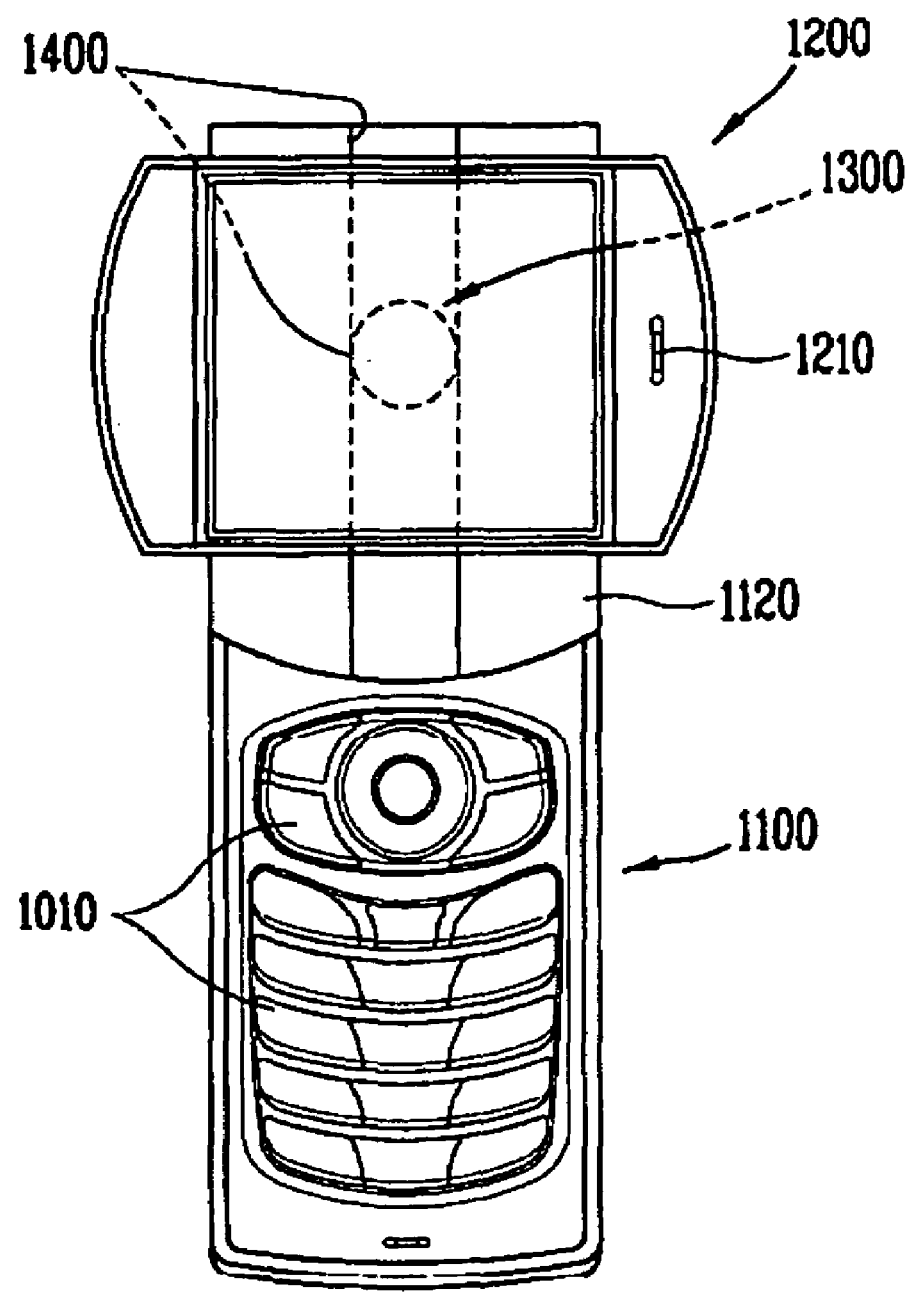
FIG. 9 is a frontal view showing a portable terminal having a position-variable display according to another embodiment of the present invention.
Figure 10:
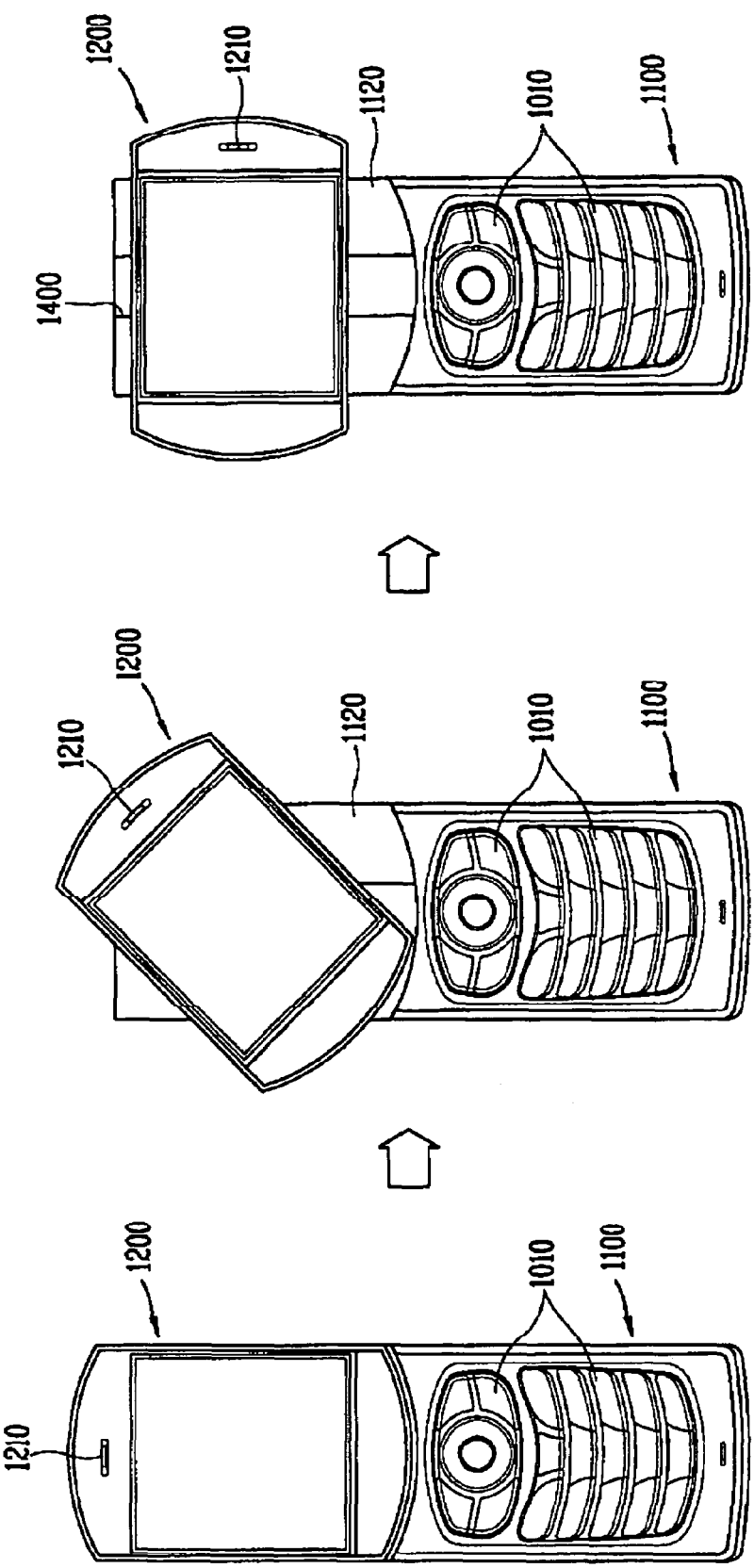
FIG. 10 is a frontal view showing an operation state of the portable terminal having a position-variable display according to another embodiment of the present invention.

As another embodiment, the present invention can be applied to a bar-type portable terminal. As shown in FIGS. 9 and 10, the portable terminal having a position-variable display comprises: a main body 1100 including an input unit 1010 such as a key pad and a connecting member 1120; a display unit 1200 for displaying information; and a rotating means 1300 coupled between the main body 1100 and the display unit 1200 for rotating the display unit 1200. A sliding means 1400 for slidably moving the display unit 1200 on the main body 1100 is coupled between the display unit 1200 and the main body 1100. A speaker 1210 is mounted on the display unit 1200.

The construction of the rotating means 1300 and the slidint means 1400 are the same as the aforementioned construction.

In accordance with the present invention, the portable terminal with a position-variable display and the operation method thereof allow the user to view images on a portable terminal in a long screen format as well as allow the user to enjoy additional services such as the Internet and other multimedia services in a wide screen format by merely rotating the display unit. As a result, the user can easily and conveniently operate the portable terminal.

Furthermore, when the user watches the wide screen, he or she can put the portable terminal on a table or other flat surface instead of holding the portable terminal. Also, the structural integrity of the portable terminal while in the wide screen format is improved over the related art because the display unit is coupled to the folder by surface-contact. Thus, damage to the components is prevented even if the user drops the portable terminal. Accordingly, the portable is highly reliable.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A portable terminal comprising:
a main body;
a display unit rotatably mounted on the main body for displaying information;
a sliding means for moving the display unit in a direction along a length of the portable terminal; and
a rotating means mounted between the main body and the display unit for supporting the display unit to be angularly rotated along a plane of the main body, the rotating means configured to fix the display unit at one of a plurality of rotational positions including at least three different rotational positions within a range of 0°-90°,
wherein the sliding means comprises:
a guide groove formed on a surface of the main body in a direction along the length of the main body;
sliding grooves formed on side walls of the guide groove;
sliding protrusions formed at sides of the rotating means and movably inserted into the sliding grooves; and
a removable unit for fixing the sliding protrusions in a set position, and wherein the rotating means comprises:
a base unit coupled to the main body;
a cylindrical axis unit formed at a surface of the base unit;
a cam holder coupled to the display unit;
a cylinder unit formed at the cam holder, the cylinder unit having an inside diameter that is larger than an outer diameter of the cylindrical axis unit, wherein the cam holder comprises a mounting unit formed at an outer circumference of the cylinder unit;
a through hole formed at the base unit, through which wire for coupling the display unit and the main body passes and extends to a hollow portion of the cylindrical axis unit;
a position fixing protrusion unit formed at the base unit;
a cam unit formed at an end of the cylinder unit, the cam unit having a plurality of concave and convex parts and allowing the display unit to stop at the plurality of rotational positions by engaging the position fixing protrusion unit;
pressuring means inserted into the mounting unit for pressuring the cam holder to the base unit; and
a fixing member fixedly coupled to an end of the cylindrical axis unit and inserted into the cylinder unit for supporting the pressuring means, wherein the fixing member is fixed at an outer circumference of the cylindrical axis unit.

2. The portable terminal of claim 1, further comprising:
a housing unit formed on a surface of the main body and corresponding with an outer appearance of the display unit such that the display unit is rotationally disposed in the housing unit.

3. The portable terminal of claim 2, wherein the display unit comprises:
a rotary casing; and
a display fixedly coupled to the rotary casing for displaying images on a screen,
wherein a width of the rotary casing is equivalent to a width of the main body.

4. The portable terminal of claim 3, wherein at least one side of the rotary casing has a curved surface with a predetermined radius of curvature.

5. The portable terminal of claim 4, wherein the radius of curvature of the at least one side of the rotary casing is identical to a radius of curvature of a short jaw surface of the housing unit.

6. The portable terminal of claim 3, wherein the display is formed in a rectangular shape having a length and a width, wherein the length of the display lies along the same direction as the length of the display unit and the width of the display lies along the same direction as the width of the display unit.

7. The portable terminal of claim 1, wherein a sensing means for sensing a position of the display unit is disposed in the main body and the display unit.

8. The portable terminal of claim 7, wherein the sensing means comprises magnets disposed at the display unit and a plurality of sensors arranged at the main body for sensing a position of the magnets.

9. The portable terminal of claim 1, wherein the removable unit comprises:
a plurality of plate spring protrusions formed on side walls of the guide groove and fixing grooves formed on the sliding protrusions.

10. The portable terminal of claim 9, wherein the plate spring protrusions are arranged in pairs at predetermined intervals along the length of the guide groove.

11. The portable terminal of claim 10, wherein a center pair of plate spring protrusions are positioned at the center of the length of the guide groove.

12. The portable terminal of claim 1, wherein at least one speaker unit is installed on the display unit.

13. The portable terminal of claim 1, further comprising:
an image output corrector for changing a position of an output image of the portable terminal according to a changed position of the display unit.

14. A portable terminal comprising:
a main body;
a folder coupled to the main body;
a display unit rotatably mounted on the folder for displaying information;
a sliding means for moving the display unit in a direction along a length of the folder; and
a rotating means mounted between the folder and the display unit for supporting the display unit to be angularly rotated along a plane of the folder, the rotating means configured to fix the display unit at one of a plurality of rotational positions including at least three different rotational positions within a range of 0°-90°,
wherein the sliding means comprises:
a guide groove formed on a surface of the folder in a direction along the length of the folder;
sliding grooves formed on side walls of the guide groove;
sliding protrusions formed at sides of the rotating means and movably inserted into the sliding grooves; and
a removable unit for fixing the sliding protrusions in a set position, and wherein the rotating means comprises:
a base unit coupled to the folder;
a cylindrical axis unit formed at a surface of the base unit;
a cam holder coupled to the display unit;
a cylinder unit formed at the cam holder, the cylinder unit having an inside diameter that is larger than an outer diameter of the cylindrical axis unit, wherein the cam holder comprises a mounting unit formed at an outer circumference of the cylinder unit;
a through hole formed at the base unit, through which wire for coupling the display unit and the folder passes and extends to a hollow portion of the cylindrical axis unit;
a position fixing protrusion unit formed at the base unit;
a cam unit formed at an end of the cylinder unit, the cam unit having a plurality of concave and convex parts and allowing the display unit to stop at the plurality of rotational positions by engaging the position fixing protrusion unit;
pressuring means inserted into the mounting unit for pressuring the cam holder to the base unit; and
a fixing member fixedly coupled to an end of the cylindrical axis unit and inserted into the cylinder unit for supporting the pressuring means, wherein the fixing member is fixed at an outer circumference of the cylindrical axis unit.

* * * * *